United States Patent
Xie

(10) Patent No.: US 9,417,079 B2
(45) Date of Patent: Aug. 16, 2016

(54) NAVIGATION APPARATUS AND METHOD FOR UPDATING MAP DATA THEREOF

(71) Applicant: Shuang Xie, Shanghai (CN)

(72) Inventor: Shuang Xie, Shanghai (CN)

(73) Assignees: MITAC INTERNATIONAL CORP., Taoyuan (TW); MiTAC Research (Shanghai) Ltd., Shanghai (CN)

( * ) Notice: Subject to any disclaimer, the term of this patent is extended or adjusted under 35 U.S.C. 154(b) by 0 days.

(21) Appl. No.: 14/620,202

(22) Filed: Feb. 12, 2015

(65) Prior Publication Data

US 2015/0316388 A1 Nov. 5, 2015

(30) Foreign Application Priority Data

Apr. 30, 2014 (CN) .......................... 2014 1 0181709

(51) Int. Cl.
*G01C 21/34* (2006.01)
*G01C 21/32* (2006.01)

(52) U.S. Cl.
CPC ................ *G01C 21/32* (2013.01); *G01C 21/34* (2013.01)

(58) Field of Classification Search
CPC ......... G01C 21/34; G01C 21/32; G01C 21/30
USPC .................................. 701/410, 532, 451, 409
See application file for complete search history.

(56) References Cited

U.S. PATENT DOCUMENTS

| 6,278,941 B1 * | 8/2001 | Yokoyama | G01C 21/34 701/24 |
| 7,490,006 B2 * | 2/2009 | Sekine | G01C 21/32 701/451 |
| 2008/0103692 A1 * | 5/2008 | Nomura | G01C 21/32 701/532 |
| 2010/0057352 A1 * | 3/2010 | Nakae | G01C 21/32 701/532 |
| 2011/0172913 A1 * | 7/2011 | Nakamura | G01C 21/32 701/532 |
| 2014/0278055 A1 * | 9/2014 | Wang | G01C 21/32 701/409 |

* cited by examiner

*Primary Examiner* — Marthe Marc-Coleman
(74) *Attorney, Agent, or Firm* — Winston Hsu; Scott Margo

(57) ABSTRACT

A navigation apparatus and a method for updating map data thereof are provided. A map database of the navigation apparatus stores data of a plurality of existed roads. When coordinates of the navigation apparatus are not located on any one of the existed roads, a comparison module of the navigation apparatus determines whether the shortest distance between the coordinates and the existed roads exceeds a predetermined threshold. If the shortest distance exceeds the predetermined threshold, a map data adding module updates a traveling path according to a plurality of succeeding coordinates of the navigation apparatus until the navigation apparatus is determined to return on one of the existed roads. When the map data adding module finishes updating the traveling path, the map data adding module stores data of the traveling path in the map database of the navigation apparatus.

7 Claims, 5 Drawing Sheets

NAVIGATION APPARATUS AND METHOD FOR UPDATING MAP DATA THEREOF

BACKGROUND OF THE INVENTION

1. Field of the Invention

The present invention is related to a navigation apparatus and a method for updating map data of the navigation apparatus, and more particularly to a navigation apparatus and a method capable of automatically adding map data of new paths to update the map data of the navigation apparatus.

2. Description of the Prior Art

When a driver is driving for a long distance or through complicated streets in the city, a navigation apparatus may be used to supply the driver with clear direction to guide the driver to quickly reach a destination. However, the roads frequently changes. Roads that were closed before may now be opened. New roads may also have been added. And it is also possible that roads that are open before may now be closed. In addition, the map data of the navigation apparatus may be the map data from last year or earlier. When the navigation reaches a new road, the navigation apparatus may not be able to identify the new road. At this time, the user may only be able to wait for an updated map data. However, updating of the map data may require additional payment or the release of the updated map data may take a long time. This will cause the user inconvenience and additional cost.

SUMMARY OF THE INVENTION

An embodiment of the present invention presents a navigation apparatus. The navigation apparatus comprises a map database, a positioning module, a comparison module, and a map data adding module. The map database is configured to store data of a plurality of existed roads. The positioning module is configured to receive a positioning signal to acquire coordinates of a current position of the navigation apparatus. The comparison module is configured to determine if the coordinates are located on any one of the existed roads, and configured to determine if a shortest distance between the coordinates and any one of the existed roads exceeds a predetermined threshold when the coordinates are not located on any one of the existed roads. The map data adding module is configured to establish a traveling path when the coordinates are not located on any one of the existed roads, and configured to update the traveling path according to succeeding coordinates of the navigation apparatus acquired by the positioning module while the shortest distance exceeds the predetermined threshold until the navigation apparatus return to any one of the existed roads. The map data adding module stores data of the traveling path in the map database when the map data adding module finishes updating the traveling path.

An embodiment of the present invention presents a method of updating map data of a navigation apparatus. The method comprises accessing data of a plurality of existed roads stored in a map database of the navigation apparatus, a positioning module of the navigation apparatus receiving a positioning signal to acquire coordinates of a current position of the navigation apparatus, a comparison module of the navigation apparatus determining if the coordinates are located in any one of the existed roads, a map data adding module of the navigation apparatus establishing a traveling path and the comparison module determining if a shortest distance between the coordinates and any one of the existed roads exceeds a predetermined threshold when the coordinates are not located in any one of the existed roads, updating the traveling path according to succeeding coordinates of the navigation apparatus acquired by the positioning module while the shortest distance exceeds the predetermined threshold until the navigation apparatus return on any one of the existed roads, and when the map data adding module finishes updating the traveling path, the map data adding module storing data of the traveling path in the map database of the navigation apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
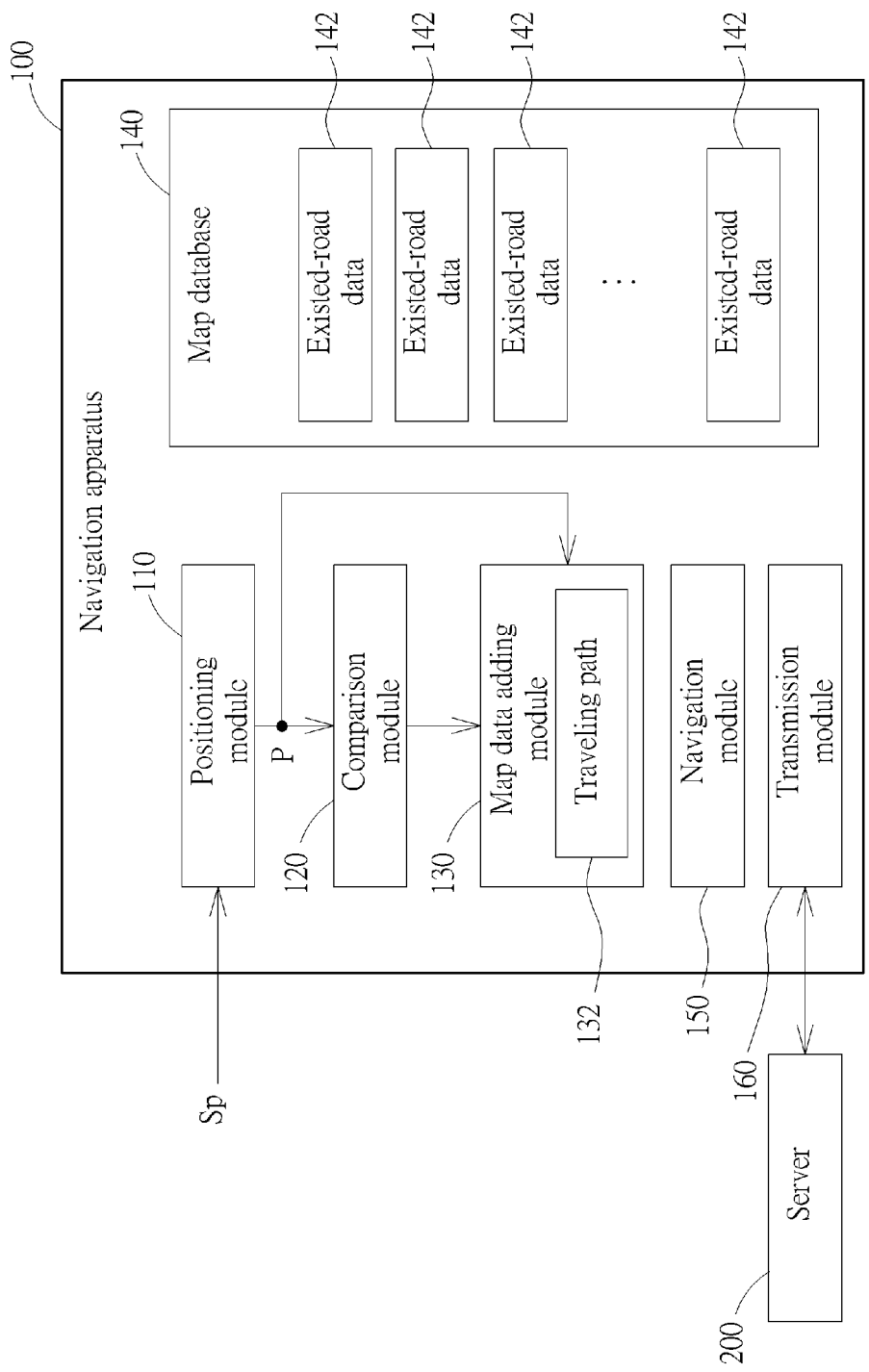
FIG. 1 illustrates a function block diagram of a navigation apparatus 100 according to an embodiment of the present invention.
Figure 2:
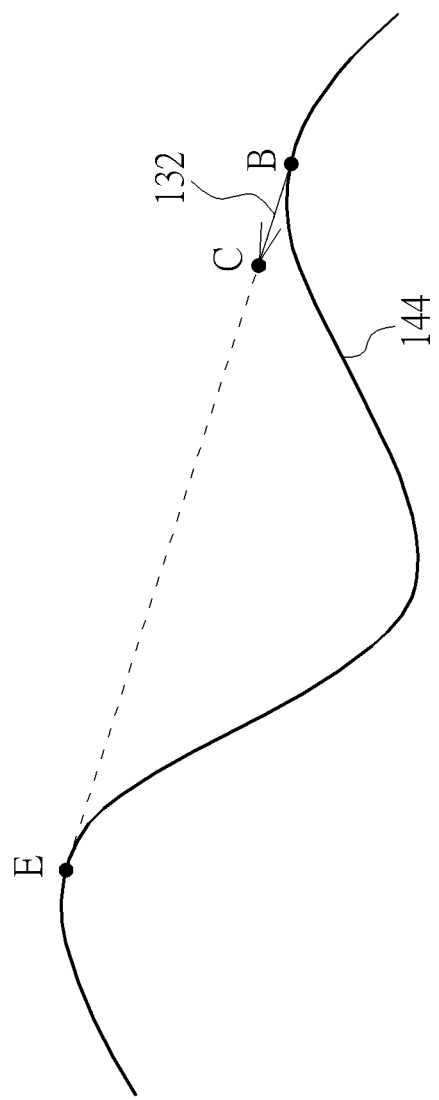
FIG. 2 to FIG. 4 are used to illustrate a process of establishing data of a travelling path in the navigation apparatus in FIG. 1.

Please refer to FIG. 1 and FIG. 2. FIG. 1 illustrates a function block diagram of a navigation apparatus 100 according to an embodiment of the present invention. FIG. 2 illustrates a map displayed during navigation of the navigation apparatus 100. The navigation apparatus 100 comprises a positioning module 110, a comparison module 120, a map data adding module 130, and a map database 140. The map database 140 is configured to store a plurality of pieces of existed-road data 142. Each of the pieces of existed-road data 142 corresponds to an existed road on a map. As shown in FIG. 2, an existed road 144 is displayed, and the data of the existed road 144 is stored in the map database 140 in a type of one of the pieces of existed-road data 142. The navigation apparatus 100 displays the existed road 144 in FIG. 2 according to the piece of existed-road data 142.

Furthermore, the positioning module 110 of the navigation apparatus 100 is configured to receive a positioning signal Sp to acquire coordinates P of a current location of the navigation apparatus 100. In an embodiment of the present invention, the positioning signal Sp may be from the navigation satellite of the Bei Dou Navigation Satellite System (BDS) or the Global Positioning System (GPS). But the present invention is not limited thereto; the navigation apparatus 100 of the present invention may be used to receive positioning signals of other navigation system.

Figure 3:
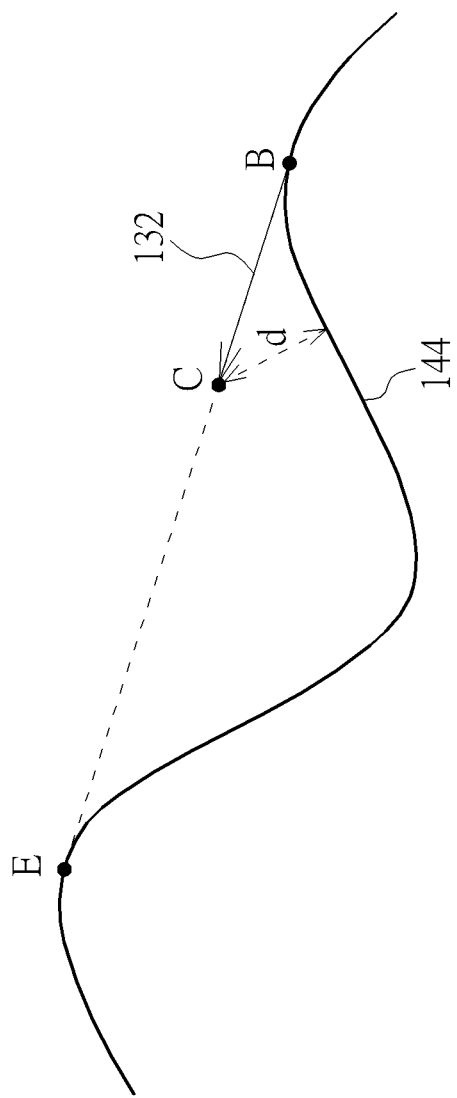
Figure 4:
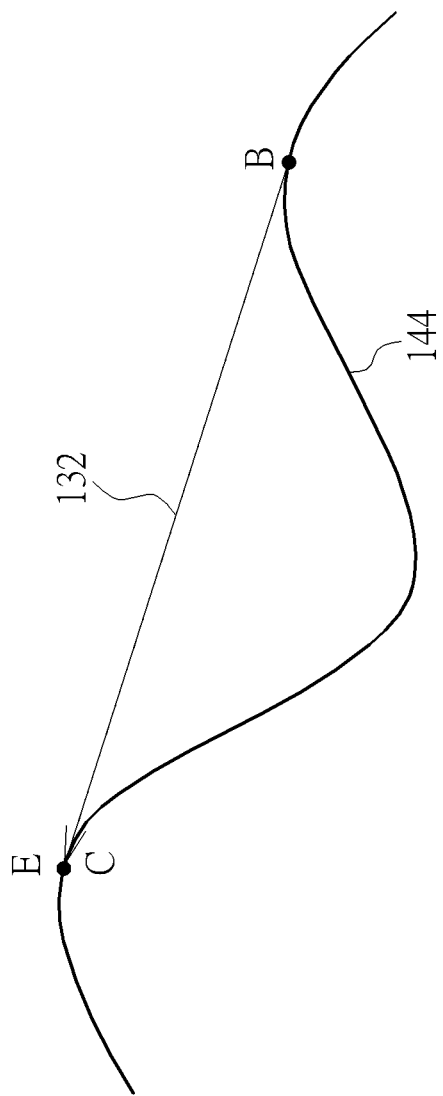

In addition, the comparison module 120 of the navigation apparatus 100 is configured to determine if the coordinates P of the navigation apparatus 100 are located on anyone of the existed roads. And when the coordinates P are not located on any one of the existed roads, the map data adding module 130 may establish a traveling path. Please refer to FIG. 2 to FIG. 4. FIGS. 2-4 are used to illustrate a process of establishing data of a traveling path 132 by the navigation apparatus 100. Wherein, B represents a starting point of the traveling path 132, C represents a current location of the navigation apparatus 100, and E represents an end point of the traveling path 132. In other words, the navigation apparatus 100 starts at point B, passing through the traveling path 132, and ends at point E. Furthermore, FIG. 2 is a map displayed by the navigation apparatus 100 not long after the current position C deviates from the existed road 144. FIG. 3 is a map displayed by the navigation apparatus 100 a period of time after the map in FIG. 2 was displayed. And, FIG. 4 is a map displayed by the navigation apparatus 100 when the end point E is reached. In addition, it should be noted that the existed road 144 in FIGS. 2-4 is one of the plurality of existed roads and that FIGS. 2-4 only shows an exemplary embodiment of the present invention. Although FIGS. 2-4 only shows one existed road 144, those skilled in the art should understand that the navigation apparatus 144 may simultaneously display a plurality of existed roads that is near the current position C. And because FIGS. 2-4 only displayed one existed road 144, the existed road 144 of FIGS. 2-4 may be viewed as the existed road that is nearest to the current position C.

When the comparison module 120 determines that the coordinates P of the current position C of the navigation apparatus 100 is not on the plurality of existed roads, the map data adding module 130 may establish the traveling path 132 and determine if the shortest distance d between the plurality of existed roads and the coordinates P exceeds a predetermined threshold. The predetermined threshold may be set by the manufacturer of the navigation apparatus 100 before being released from the factory or may be set by the user according to the need of the user. The purpose of setting the predetermined threshold is to give margin of error for the positioning of the navigation apparatus 100. In an embodiment of the present invention, the predetermined threshold may be, but is not limited to, 100 meters. When the shortest distance d does not exceed the predetermined threshold, even though the comparison module 120 may determine that the coordinates P of the current position C of the navigation apparatus 100 is not positioned on the plurality of existed roads, the traveling path 132 would not be identified as a new path. The traveling path 132 would be identified as a new path only when the comparison module 120 determines that the coordinates P of the current position C of the navigation apparatus 100 is not positioned on the plurality of existed roads and the shortest distance d exceeds the predetermined threshold.

In the embodiment, the existed road 144 in FIGS. 2-4 may be considered as the existed road of the plurality of existed road nearest to the current position C. Therefore, when the coordinates P of the current position C of the navigation apparatus 100 is not positioned on the existed road 144 in FIGS. 2-4, the coordinates P of the current position C of the navigation apparatus 100 is not positioned on the plurality of existed roads. Furthermore, the shortest distance d between the coordinates P and the plurality of existed roads is the shortest distance between the coordinates P and the existed road 144 in FIGS. 2-4. When the coordinates P of the current position C of the navigation apparatus 100 is not positioned on the existed road 144, the map data adding module 130 may establish the traveling path 132 according to the succeeding coordinates P outputted from the positioning module 110. Furthermore, while the shortest distance d exceeds a predetermined threshold, the map data adding module 130 may update the traveling path 132 according to the succeeding coordinates P of the navigation apparatus 100 obtained by positioning module 110 until the coordinates P of the navigation apparatus 100 returns to the plurality of existed roads (i.e. return to the existed road 144 shown in FIG. 4). Wherein, when the succeeding coordinates P of the navigation apparatus 100 returns to the existed road 144, the map data adding module 130 may finish updating the traveling path 132 and the map data adding module 130 may store the updated traveling path 132 in the map database 140 to become a new piece of existed-road data 142. In an embodiment of the present invention, the navigation apparatus 100 further comprises a navigation module 150 configured to plan at least one navigation route according to the pieces of existed-road data 142 (may include data of the traveling path 132) stored in the map database 140. Since the traveling path 132 is shorter than the existed road 144, after the data of the updated traveling path 132 is stored in the map database 140, if the user is at the starting point B traveling to the end point E, the navigation module 150 may plan a navigation route that includes the traveling path 132 according to the updated pieces of existed-road data 142. In this way, the traveling distance may be shortened.

In an embodiment of present invention, after the map data adding module 130 finished updating the traveling path 132, the map data adding module 130 may store the coordinates of the starting point B, the coordinates of the end point E, and the traveling distance of the traveling path 132 in the map database 140. In another embodiment of present invention, after the map data adding module 130 finished updating the traveling path 132, the map data adding module 130 may further store a traveling direction of the traveling path 132 in the map database 140. Taking FIG. 4 as an example, the traveling direction of the traveling path 132 is the direction of the starting point B to the end point E. The traveling direction of the traveling path 132 may be recorded to prevent the navigation apparatus 100 from committing an error of directing the user to pass through the traveling path 132 beginning at the end point E to the starting point B if the traveling path 132 is a one way road that has the traveling direction of the starting point B to the end point E. In an embodiment of present invention, the navigation apparatus 100 may further comprise a transmission module 160 configured to upload the updated data of the traveling path 132 to a server 200. The server 200 may further share the data of the traveling path 132 uploaded by the navigation apparatus 100 to other navigation apparatus to update the map data of the other navigation apparatus.

Figure 5:
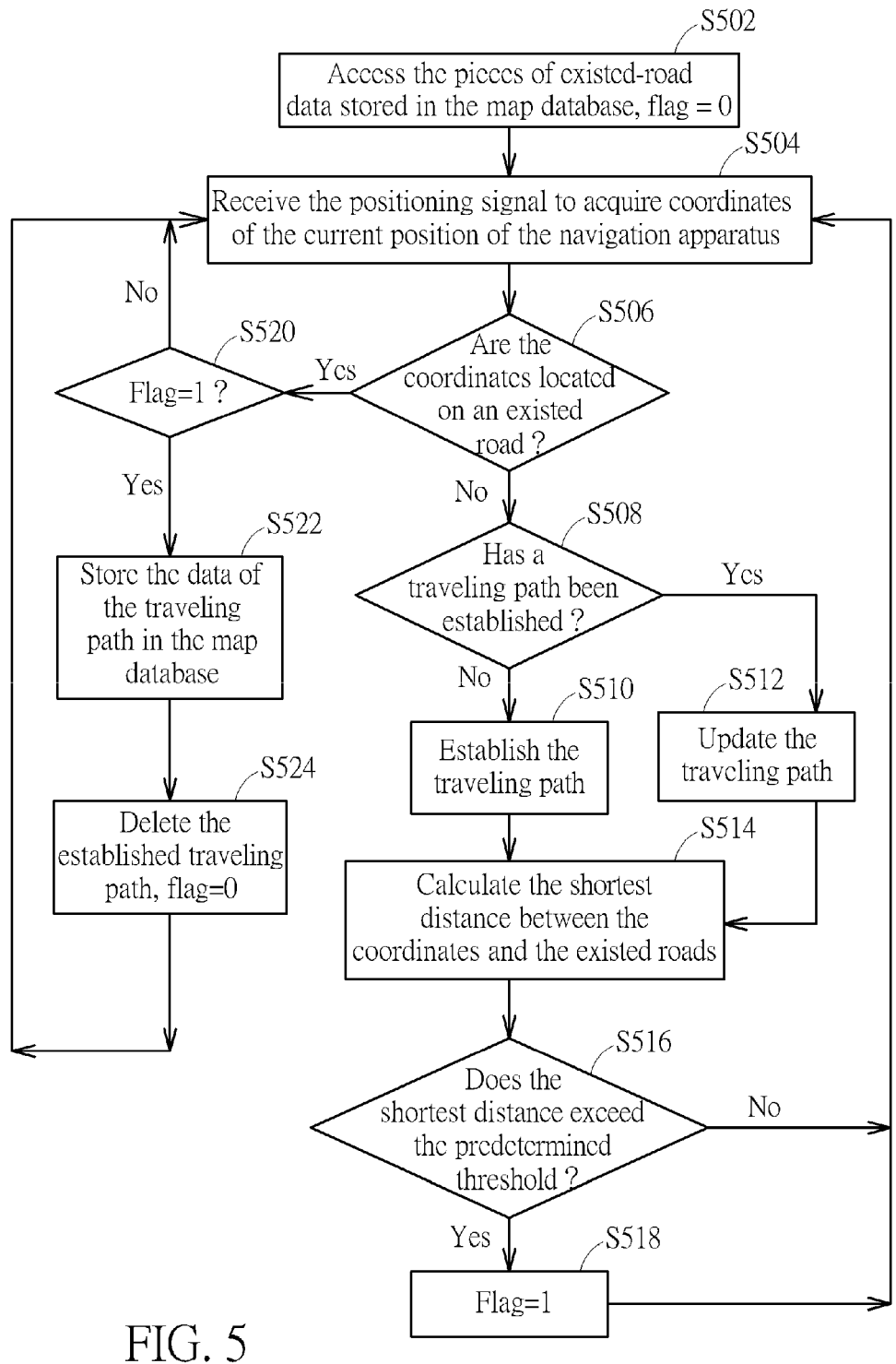
FIG. 5 illustrates a flowchart of a method of updating map data of the navigation apparatus.

FIG. 5 illustrates a flowchart of a method of updating map data of the navigation apparatus 100. In step S502, the navigation module 150 may access the pieces of existed-road data 142 stored in the map database 140 and may set a value of a flag to 0. Wherein, the purpose of the value of the flag is to conveniently determine if the shortest distance d between the coordinates P and the existed roads exceeds the predetermined threshold. When the value of the flag is 1, it indicates that the shortest distance d exceeds the predetermined threshold. And when the value of the flag is 0, it indicates that the shortest distance d does not exceed the predetermined threshold. In step S504, the positioning module 110 may receive the positioning signal Sp to acquire the coordinates P of a current position of the navigation apparatus 100. Afterwards, in step S506, the comparison module 120 may determine if the coordinates P are located on an existed road. If the coordinates P are located on the existed road, step S520 maybe performed. If the coordinates P are not located on the existed roads, step S508 may be performed. In step S508, the map data adding module 130 may determine if the traveling path 132 has been established. If the traveling path 132 has not been established, step S510 may be performed such that the map data adding module 130 may establish the traveling path 132. If the traveling path 132 has been established, step S512 may be performed such that the map data adding module 130 may update the traveling path 132 according to the succeeding coordinates P of the navigation apparatus 100 acquired by the positioning module 110. Afterwards, the comparison module 120 may calculate the shortest distance d between the coordinates P and the existed roads in step S514 and may determine if the shortest distance d exceeds a predetermined threshold in step S516. If the shortest distance d does not exceed the predetermined threshold, step S504 may be repeated and continue navigation. If the shortest distance d exceeds the predetermined threshold, step S518 may be performed to set the value of the flag to 1 and step S504 maybe repeated after.

In step S520, the map data adding module 130 may determine if the value of the flag is 1. When the map data adding module 130 determines the value of the flag is 0 in step S520, it indicates that the shortest distance d does not exceed the predetermined threshold. In this time, if the map data adding module 130 has already established the traveling path 132, the map data adding module 130 may delete the established traveling path 132 and then perform step S504. During step S520, if the value of the flag is determined to be 1, this indicates that the traveling path 132 has been established and the navigation apparatus 100 has returned to the existed roads. And then, step S522 may be performed and the data of the traveling path 132 may be stored in the map database 140 by the map data adding module 130 and become a new piece of existed-road data 142. Afterwards, in step 524, the map data adding module 130 may delete the established traveling path 132 and set the value of the flag to be 0.

The navigation apparatus and method of updating map data of a navigation apparatus of the present invention may automatically store map data of a new path that has been passed through to the map database such that the new path that has been passed through may be used in the next navigation. As a result, the accuracy of the map data of the navigation apparatus maybe increased because of the real time updating. And the navigation apparatus may plan a navigation route according to the map data updated at real time to better meet the needs of the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A navigation apparatus, comprising:
    a memory;
    a map database, stored in the memory and configured to store data of a plurality of existed roads;
    a positioning module, configured to receive a positioning signal to acquire coordinates of a current position of the navigation apparatus;
    a comparison module, configured to determine if the coordinates are located on any one of the existed roads, and configured to determine if a shortest distance between the coordinates and any one of the existed roads exceeds a predetermined threshold when the coordinates are not located on any one of the existed roads;
    a map data adding module, configured to establish a traveling path when the coordinates are not located on any one of the existed roads, and configured to update the traveling path according to succeeding coordinates of the navigation apparatus acquired by the positioning module while the shortest distance exceeds the predetermined threshold until the navigation apparatus return to any one of the existed roads, wherein the map data adding module stores data of the traveling path in the map database as data of a new existed road only when a distance between the traveling path and the existed roads exceeds the predetermined threshold; and
    a display, configured to display a map according to data of all existed roads stored in the map database.

2. The navigation apparatus of claim 1, further comprising a navigation module configured to plan at least one navigation route according to the data of the traveling path and the data of the existed roads stored in the map database.

3. The navigation apparatus of claim 1, wherein the map data adding module stores coordinates of a starting point, coordinates of an end point and a traveling distance of the traveling path in the map database when the map data adding module finishes updating the traveling path.

4. The navigation apparatus of claim 3, wherein the map data adding module further stores a travelling direction of the traveling path in the map database of the navigation apparatus when the map data adding module finishes updating the traveling path.

5. The navigation apparatus of claim 1, further comprising a transmission module configured to upload the data of the traveling path to a server.

6. A method of updating map data of a navigation apparatus, comprising:
    accessing data of a plurality of existed roads stored in a map database of the navigation apparatus;
    a positioning module of the navigation apparatus receiving a positioning signal to acquire coordinates of a current position of the navigation apparatus;
    a comparison module of the navigation apparatus determining if the coordinates are located in any one of the existed roads;
    a map data adding module of the navigation apparatus establishing a traveling path and the comparison module determining if a shortest distance between the coordinates and any one of the existed roads exceeds a predetermined threshold when the coordinates are not located in any one of the existed roads;
    updating the traveling path according to succeeding coordinates of the navigation apparatus acquired by the positioning module while the shortest distance exceeds the predetermined threshold until the navigation apparatus return on any one of the existed roads; the map data adding module storing data of the traveling path in the map database of the navigation apparatus as data of a new existed road only when a distance between the traveling path and the existed roads exceeds the predetermined threshold; and
    a display of the navigation apparatus displaying a map according to the data of all existed roads stored in the map database.

7. The method of claim 6, further comprising:
    a transmission module of the navigation apparatus uploading the data of the traveling path to a server such that the server stores the data of the traveling path as a new set of data of existed roads when the map data adding module finishes updating the traveling path.

* * * * *